US012695688B1

(12) United States Patent
Zimmerman et al.

(10) Patent No.: US 12,695,688 B1
(45) Date of Patent: Jul. 28, 2026

(54) DETERMINING NATIVE NETWORK TRAFFIC INFORMATION FOR VIRTUALLY LOGGED NETWORK EVENTS

(71) Applicant: Amazon Technologies, Inc., Seattle, WA (US)

(72) Inventors: Stefan Zimmerman, Scottsdale, AZ (US); Childress Pillsbury, Austin, TX (US); Dibyendu Das, Irvine, CA (US); Rama Subramanian Amaravathi Jayachandar, Snohomish, WA (US); James Olson, Waukesha, WI (US); Shamnad Mohamed Shaffi, Bothell, WA (US); Fahri Yardimci, Dublin (IE); Navaneeth Atluri, Elkridge, MD (US); Jacob Ryan Walter, Chandler, AZ (US)

(73) Assignee: Amazon Technologies, Inc., Seattle, WA (US)

( * ) Notice: Subject to any disclaimer, the term of this patent is extended or adjusted under 35 U.S.C. 154(b) by 185 days.

(21) Appl. No.: 18/537,454

(22) Filed: Dec. 12, 2023

(51) Int. Cl.
| | |
|---|---|
| *H04L 9/40* | (2022.01) |
| *H04L 43/04* | (2022.01) |
| *H04L 43/20* | (2022.01) |
| *H04L 61/2517* | (2022.01) |

(52) U.S. Cl.
CPC .............. *H04L 43/20* (2022.05); *H04L 43/04* (2013.01); *H04L 61/2517* (2013.01); *H04L 63/1416* (2013.01)

(58) Field of Classification Search
CPC ..... H04L 43/20; H04L 43/04; H04L 61/2517; H04L 63/1416
See application file for complete search history.

(56) References Cited

U.S. PATENT DOCUMENTS

| | | | |
|---|---|---|---|
| 2003/0225881 A1* | 12/2003 | Saxena ................. H04L 45/742 709/224 |
| 2006/0095587 A1* | 5/2006 | Bhattacharya ...... H04L 61/2591 709/245 |
| 2022/0335008 A1* | 10/2022 | Ajmera ................. G06F 16/148 |

* cited by examiner

*Primary Examiner* — Lesa M Kennedy
(74) *Attorney, Agent, or Firm* — Athorus, PLLC

(57) ABSTRACT

Described are systems and methods for determining a native format (e.g., original state) for virtually logged network information and associating the native format with the virtually logged network information. Embodiments of the present disclosure can extract network traffic information from multiple sources and generate translation tables from each corresponding source of network traffic information. The translation tables may be sequentially queried with input network traffic information associated with a virtually logged network event to determine the native network traffic information.

18 Claims, 7 Drawing Sheets

DETERMINING NATIVE NETWORK TRAFFIC INFORMATION FOR VIRTUALLY LOGGED NETWORK EVENTS

BACKGROUND

Network monitoring has traditionally been performed on an on-premises basis. On-premises monitoring of network traffic, systems, services, etc. typically logs network traffic information in a format that has not been translated, proxied, etc. Accordingly, the on-premises logged network data, such as source addresses, source ports, destination addresses, destination ports, network protocols, and the like, are typically saved in a native format. Having the logged network data in their native format can facilitate efficient consumption and utilization of the logged network data without having to manipulate and/or correlate the logged network data into a usable form. However, unlike on-premises monitoring and logging of network traffic information, virtual monitoring and logging of network traffic, system activity, service activity, etc. can introduce certain difficulties. For example, virtual monitoring and logging of such information may subject the data to manipulation of the information by various translation and/or proxying layers along its paths, thereby obfuscating the native information associated with the virtually logged data.

BRIEF DESCRIPTION OF THE DRAWINGS

The detailed description is described with reference to the accompanying figures.

DETAILED DESCRIPTION

Figure 1:
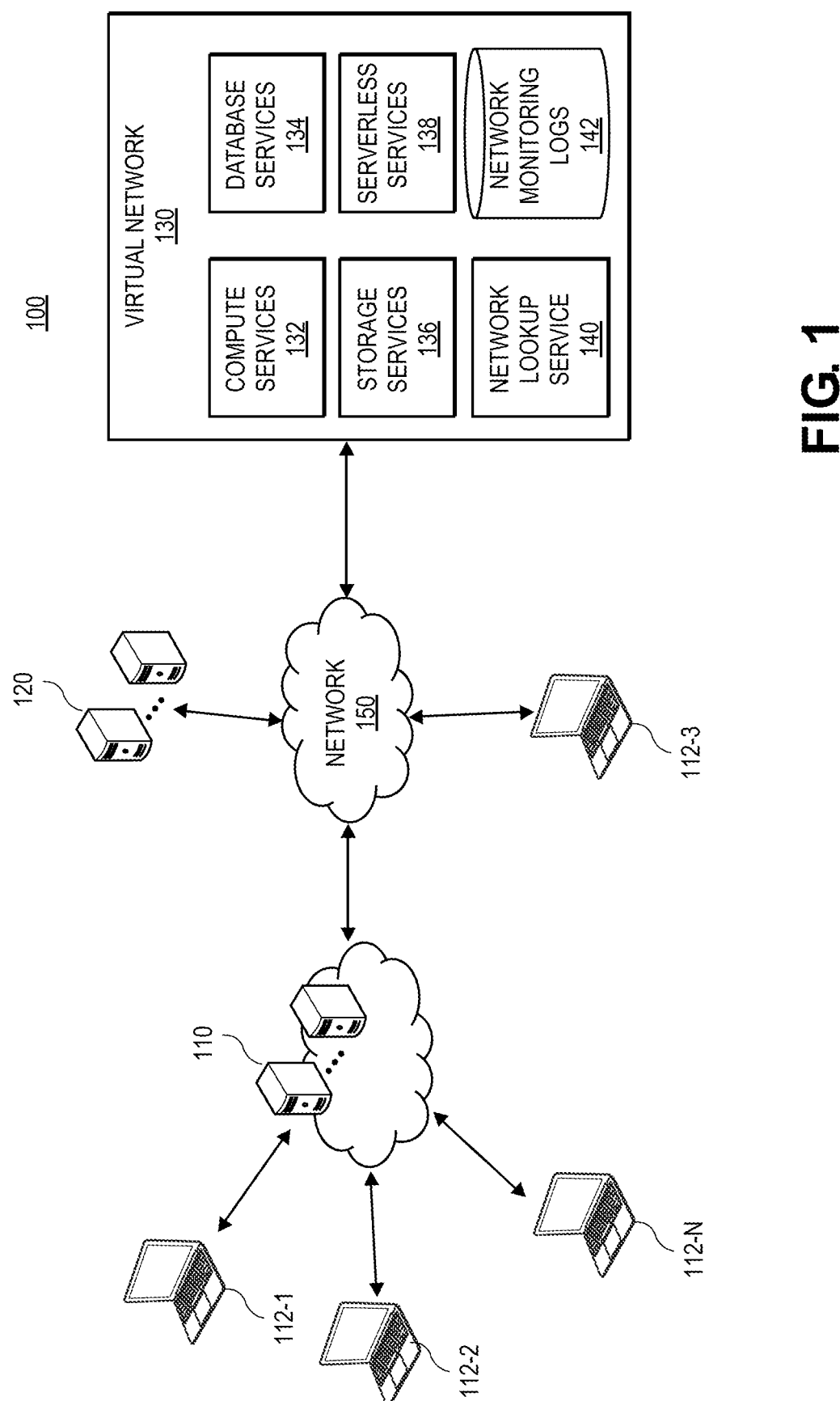
FIG. 1 is an illustration of an exemplary computing environment, according to exemplary embodiments of the present disclosure.

As is set forth in greater detail below, exemplary embodiments of the present disclosure are generally directed to systems and methods for determining a native format (e.g., original state) for virtually logged network traffic information and associating the native format with the virtually logged network traffic information. As network events that are virtually logged may have been manipulated by one or more translations and/or proxying layers, the virtually logged network traffic information associated with such network events may not include the information in a native format. This can limit the usefulness of such information, especially in circumstances of a security incident (e.g., network intrusion, a phishing attack a ransomware attack, denial of service attack, etc.), a network outage, and the like. Accordingly, exemplary implementations of the present disclosure can provide efficient and low latency systems and methods for determining the native format of such virtually logged network traffic information.

According to exemplary implementations of the present disclosure, logged network traffic information may be extracted from multiple different network data log sources. Each network data log source may include certain network traffic information in connection with each logged network event. The logged network traffic information extracted from each network data log source may be compiled into a corresponding translation table that may be populated with the collected network traffic information. For example, the collected network traffic information used to populate the translation tables can include a timestamp, a translated source address, a translated source port, a translated destination address, a translation destination port, a protocol identifier, an original source address, an original source port, an original destination address, an original destination port, a network action (e.g., create or close session), and the like. According to certain aspects of the present disclosure, the network traffic information received from the various network data log sources may be collected in real-time, and the translation tables may be stored in a high-speed datastore (e.g., an in-memory datastore, a virtual caching service, and the like). Accordingly, the translation tables may be continuously updated with new logged network information that may be continuously extracted from each network data log source as network information is logged in connection with new network events.

According to exemplary embodiments of the present disclosure, the translation tables may be used to determine the native format for virtually logged network traffic information in connection with network events. In exemplary implementations, it may be desirable to obtain the native format for virtually logged network events in connection with security incidents, network outages, and the like.

In determining the native format for a virtually logged network event, the virtually logged network traffic information associated with the virtually logged network event may be used to query a first translation table to correlate the virtually logged network event to a corresponding entry in the first translation table. In connection with a virtually logged network event and/or session of interest, the virtually logged network information may include for example, a timestamp, a source address, a source port, a destination address, a destination port, a protocol identifier, a network action (e.g., create or close session) and the like. Accordingly, the entry may be correlated to the virtually logged network event based on one or more of a timestamp, a source address, a source port, and the like. According to certain aspects of the present disclosure, adjustments may be made to the timestamps to account for latency, jitter, and other timing issues that may be encountered between the various sources of network information. The untranslated source address and/or untranslated port information associated with the identified entry in the first translation table may then be extracted from the entry in the first translation table. One or more of the untranslated source address, untranslated port information, and/or the timestamp information may then be used to query a second translation table to correlate an entry in the second translation table with the virtually logged network event. The entry in the second translation table may include the native source address and/or native source port information for the virtually logged network event. Accordingly, the native source address and/or native source port information may be associated with the virtually logged network event and provided to downstream services and processes for further processing.

Advantageously, exemplary embodiments of the present disclosure can facilitate virtual monitoring and logging of network, system, and services by providing efficient and low latency systems and methods for determining the original state (e.g., native format) of virtually logged network events. Quickly and efficiently determining the original state (e.g., native format) of virtually logged network events can facilitate processing the information by downstream systems and processes, especially in connection with time-sensitive events, such as security incidents, network outages, and the like.

FIG. 1 is an illustration of an exemplary computing environment 100, according to exemplary embodiments of the present disclosure.

As shown in FIG. 1, exemplary computing environment 100 may include virtual network 130, which may communicate over network 150 with other networks 110, client devices 112, and/or computing resources 120. Networks 110 may represent any type of private and/or public network (e.g., a wide area network, local area network, virtual network, virtual private cloud, cloud computing network/platform, and the like), computing resources 120 may represent any type of remote computing resources (e.g., servers, etc.), client devices 112 may include any type of computing device, such as a smartphone, tablet, laptop computer, desktop computer, wearable, etc., and network 150 may include any wired or wireless network (e.g., the Internet, cellular, satellite, Bluetooth, Wi-Fi, etc.) that can facilitate communications between virtual network 130, networks 110, client devices 112, and/or computing resources 120.

Virtual network 130 may include a virtual computing platform, such as a cloud computing platform/environment, and may provide various services and/or resources that do not require end-user knowledge of the physical premises and configuration of the system that delivers the services. For example, virtual network 130 may include "on-demand computing platforms," "software as a service (SaaS)," "infrastructure as a service (IaaS)," "platform as a service (PaaS)," "platform computing," "network-accessible platforms," "data centers," "virtual computing platforms," and so forth. As shown in FIG. 1, virtual network 130 may provide compute services 132, database services 134, storage services 136, serverless services 138, and the like. In exemplary implementations, virtual network 130 may also provide network lookup service 140 and network monitoring logs 142. Further, virtual network 130 may be implemented as one or more virtual private clouds, and compute services 132 and serverless services 138 may be implemented as instances of virtual machines, hypervisors, and the like. Example components of a remote computing resource implementing virtual network 130 are discussed below with respect to FIG. 5.

According to exemplary implementations of the present disclosure, virtual network 130 may be representative of computing resources that may form a portion of a larger networked computing platform (e.g., a cloud computing platform, and the like). In the exemplary implementation illustrated in FIG. 1, virtual network 130 may be configured to virtually monitor and log network traffic information associated with network traffic between one or more of networks 110, client devices 112 (e.g., client devices 112-1, 112-2, 112-3, and/or 112-N), and/or computing resources 120. For example, the network traffic logged and/or monitored by virtual network 130 may include communications and/or transmissions by and between networks 110, client devices 112, computing resources 120, other components of virtual network 130 (e.g., virtual private clouds, network subnets, etc.) and/or other network infrastructure and interfaces (e.g., routers, switches, firewalls, gateways, etc.) in connection with the accessing of systems, files, services, applications, sending of messages and other communications, and the like. Such virtually monitored and logged network traffic information may be obtained, for example, from various network interfaces via traffic/port mirroring, port monitoring, switched port analyzers, and the like, and stored in one or more network monitoring log datastores 142. However, as the network traffic information may have been manipulated by one or more translations (e.g., network address translations (NATs), etc.) and/or proxying layers, the network traffic information logged by virtual network 130 may not include the logged traffic information in a native format.

Accordingly, in exemplary embodiments of the present disclosure, network lookup service 140 may be configured to determine a native format (e.g., original state) for network traffic information that is monitored and logged by virtual network 130 and stored in network monitoring log datastores 142. For example, network lookup service 140 may be configured to extract network traffic information from multiple different network traffic data log sources, generate and/or populate translation tables utilizing the extracted network traffic information, and perform queries of the translation tables to determine the native format of the virtually logged network traffic information.

In an exemplary implementation, network lookup service 140 may be configured to extract and compile network traffic information from multiple different network traffic data log sources in real-time into corresponding translation tables. Preferably, network lookup service 140 extracts network traffic information from at least two different network traffic data log sources. For example, network lookup service 140 may extract and compile network traffic information from a NetFlow log to generate and/or populate a first translation table and extract and compile network traffic information from a syslog server to generate and/or populate a second translation table. Further, the translation tables may be continuously updated in real-time as new network traffic information is logged by the network traffic data log sources from which network lookup service 140 extracts the network traffic information. Conversely, data that is older than a predetermined threshold (e.g., 12 hours, 24 hours, 36 hours, 48 hours, 1 week, etc.) may be deleted from the translation tables.

According to exemplary embodiments of the present disclosure, the translation tables may be stored in a high-speed datastore, such as an in-memory datastore, a virtual caching service, and the like. In exemplary implementations, the translation tables may employ an in-memory key-value database, such as a Redis (e.g., Remote Dictionary Server) key-value database, or other data structure to facilitate timely and efficient querying of the translation tables.

Continuing the exemplary implementation where network lookup service 140 extracts and compiles network traffic information from a NetFlow log to generate and populate a first translation table, network traffic information for each network event logged by the NetFlow log may be extracted. For example, the network traffic information extracted from the NetFlow log for each network event may include a timestamp, a translated (e.g., an address that has been subjected to a NAT, etc.) destination address, a translated destination port, a translated source address, a translated source port, a network event type (e.g., creation or closing of a session), an untranslated destination address, an untranslated destination port, an untranslated source address, an untranslated source port, and the like. Accordingly, the first translation table may include entries including network traffic information for the network events logged by and extracted from the NetFlow log and may be continuously updated as new network traffic events are logged in the NetFlow log.

Continuing the exemplary implementation where the translation tables employ a Redis key-value database, in connection with the first translation table generated from the NetFlow log, keys may first be defined for each particular translated source address, translated source port, translated destination address, translated destination port, and protocol extracted from the NetFlow log. Accordingly, when a network event with a particular translated source address, translated source port, translated destination address, translated destination port, and protocol is extracted from the NetFlow log, the untranslated source address, untranslated source port, the network event type, and the timestamp associated with the network event may be written as the value of the key to the Redis database. Accordingly, for each network event logged in the NetFlow log, the associated untranslated source address, untranslated source port, the network event type, and the timestamp may be written as key values to the corresponding key in real-time, so as to continuously update the first translation table. According to aspects of the present disclosure, a key may be associated with multiple time stamps and corresponding values (e.g., the untranslated source address, untranslated source port, etc.), as multiple network events having the same address and port may be repeatedly encountered. Further, key values that have exceeded a predetermined threshold time period (e.g., 1 hour, 12 hours, 24 hours, 36 hours, 1 week, etc.) may be periodically deleted.

In addition to extracting and compiling network traffic information from a first network traffic data log source such as a NetFlow log to generate and populate a first translation table, network lookup service 140 may be configured to extract and compile network traffic information from a second network traffic data log source such as a syslog server. Similar to the extraction and compilation of network traffic information from the NetFlow log, network lookup service 140 may compile network traffic information associated with network events from the syslog server to generate and/or populate a second translation table. In exemplary implementations, the network traffic information extracted from the syslog server log for each network event may also include a timestamp, a translated (e.g., an address that has been subjected to a NAT, etc.) destination address, a translated destination port, a translated source address, a translated source port, a network event type (e.g., creation or closing of a session), an untranslated destination address, an untranslated destination port, an untranslated source address, an untranslated source port, and the like. Accordingly, the second translation table may include entries for each logged network event that includes the extracted network traffic information associated with each logged network event and may be continuously updated as new network traffic events are logged in the syslog server. Further, according to exemplary embodiments of the present disclosure, the translated source addresses and the translated source ports of the second translation table (e.g., extracted from the syslog server) may correspond to the untranslated source addresses and the untranslated source ports that were written to the first translation table (e.g., and extracted from the NetFlow log). Further, the untranslated destination address, untranslated destination port, untranslated source address, and untranslated source port may correspond to the native format (e.g., original state) of the network information associated with the logged network events.

Continuing the exemplary implementation where the translation tables employ a Redis key-value database, in connection with the second translation table generated from the syslog server, keys may first be defined for each particular translated source address, translated source port, translated destination address, translated destination port, and protocol extracted from the syslog server. Accordingly, when a network event with a particular translated source address, translated source port, translated destination address, translated destination port, and protocol is extracted from the syslog server, the untranslated source address, untranslated source port, the network event type, and the timestamp associated with the network event may be written as the value of the key to the Redis database. Accordingly, for each network event logged in the syslog server, the associated untranslated source address, untranslated source port, the network event type, and the timestamp may be written as key values to the corresponding key in real-time, so as to continuously update the second translation table. According to aspects of the present disclosure, a key may be associated with multiple time stamps and corresponding values (e.g., the untranslated source address, untranslated source port, etc.), as multiple network events having the same address and port may be repeatedly encountered. Further, key values that have exceeded a predetermined threshold time period (e.g., 1 hour, 12 hours, 24 hours, 36 hours, 1 week, etc.) may be periodically deleted.

In addition to generating and populating the translation tables, network lookup service 140 may be configured to query the first and second translation tables to determine the native format (e.g., original state) of the network traffic information associated with a virtually logged network event. According to exemplary embodiments of the present disclosure, the native format may be determined for all virtually logged network events, in connection with a security incident, in connection with a network outage, and the like.

In exemplary implementations of the present disclosure, network information for a virtually logged network event for which its native format is to be determined (referred to herein as the input network event and/or the query network event) may be received by network lookup service 140. For example, determination of the native format for the network information for the input network event may be performed in connection with a security incident, a network outage, and the like. According to certain aspects of the present disclosure, the network information for the input network event may be received and/or processed on a delay to ensure that the corresponding network information has been extracted from the multiple different network data log sources and written to the translation tables.

After receipt of the network information associated with the input network event, certain network information, such as the source address, source port, destination address, destination port, protocol, and/or timestamp may be used to sequentially query the translation tables to determine the native format of the network information associated with the input network event. Accordingly, the native format of the network information may be associated with the input network event and/or the network information associated with the input network event and provided to downstream services and/or processes. For example, the native format of the network information may be provided to security tools, data log management tools, data analytics tools, and the like.

Continuing the exemplary implementation where two translation tables are generated and populated from network traffic information from a NetFlow log and a syslog server, network lookup service 140 may utilize the network information associated with the input network event to query the first translation table. For example, one or more of the source address, source port, destination address, destination port and/or timestamp associated with the input network event may be used to query the first translation table to identify a matching key in the first translation table. Optionally, if a matching key is not identified in the first translation table, the source address and the destination address may be switched, and the first translation table may again be queried to identify a matching key. After a matching key is identified, the timestamp associated with the input network event may be used to lookup values (e.g., the untranslated source address, the untranslated source port, etc.) corresponding to the timestamp. According to certain aspects of the present disclosure, the key values may be organized in a reverse sort order based on timestamps. Further, the timestamp values may be adjusted to compensate for jitter and/or latency between the various network traffic logs and information. Further, it may be determined whether the network event type indicates that the input network event corresponds to the creation of a session. In the event that the network event type indicates the closing of a session, it may be determined that there is a timestamp jitter and/or latency issue, and the values may be discarded.

In the event that the network event type indicates the creation of a session, the values obtained from the first translation table (e.g., the untranslated source address, the untranslated source port, etc.) corresponding to the identified key and timestamp may then be used to query the second translation table. Similar to querying the first translation table, network lookup service 140 may utilize the values obtained from the first translation table to query the second translation table to identify a matching key in the second translation table. After a matching key is identified, the timestamp associated with the input network event may be used to lookup values (e.g., the untranslated source address, the untranslated source port, etc.) corresponding to the timestamp. According to certain aspects of the present disclosure, the key values may be organized in a reverse sort order based on timestamps. Further, the timestamp values may be adjusted to compensate for jitter and/or latency between the various network traffic logs and information. The key values corresponding to the timestamp may correspond to the native network information (e.g., source address, source port, etc.) for the input network event. Accordingly, network lookup service 140 may associate the native network information with the input network event and/or the network information associated with the input network event and provided to downstream services and/or processes.

Figure 2A:
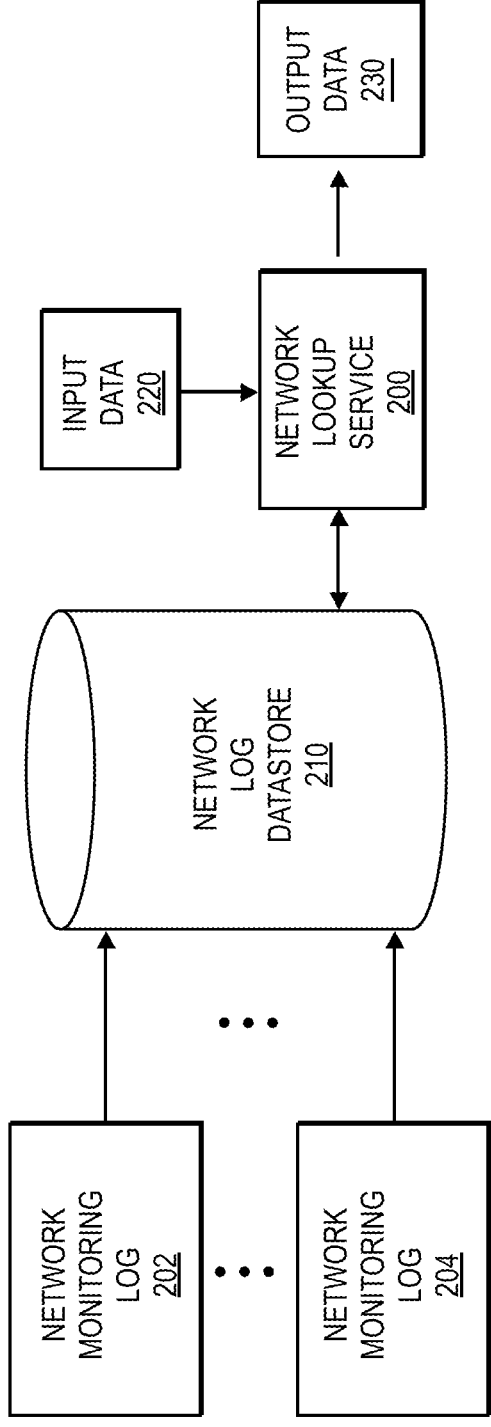
FIGS. 2A-2C are block diagrams illustrating an exemplary network lookup service, according to exemplary embodiments of the present disclosure.
Figure 2B:
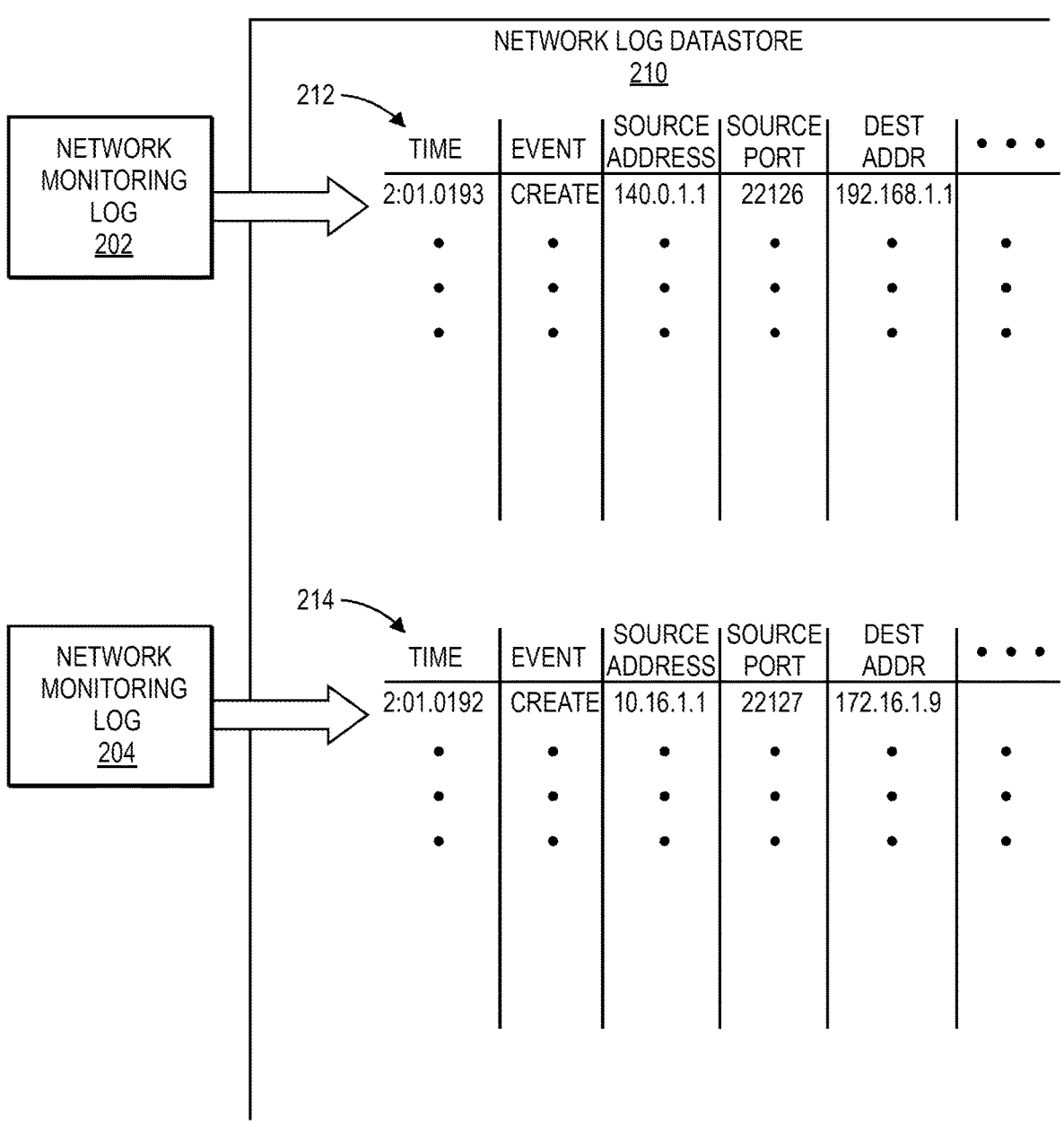
Figure 2C:
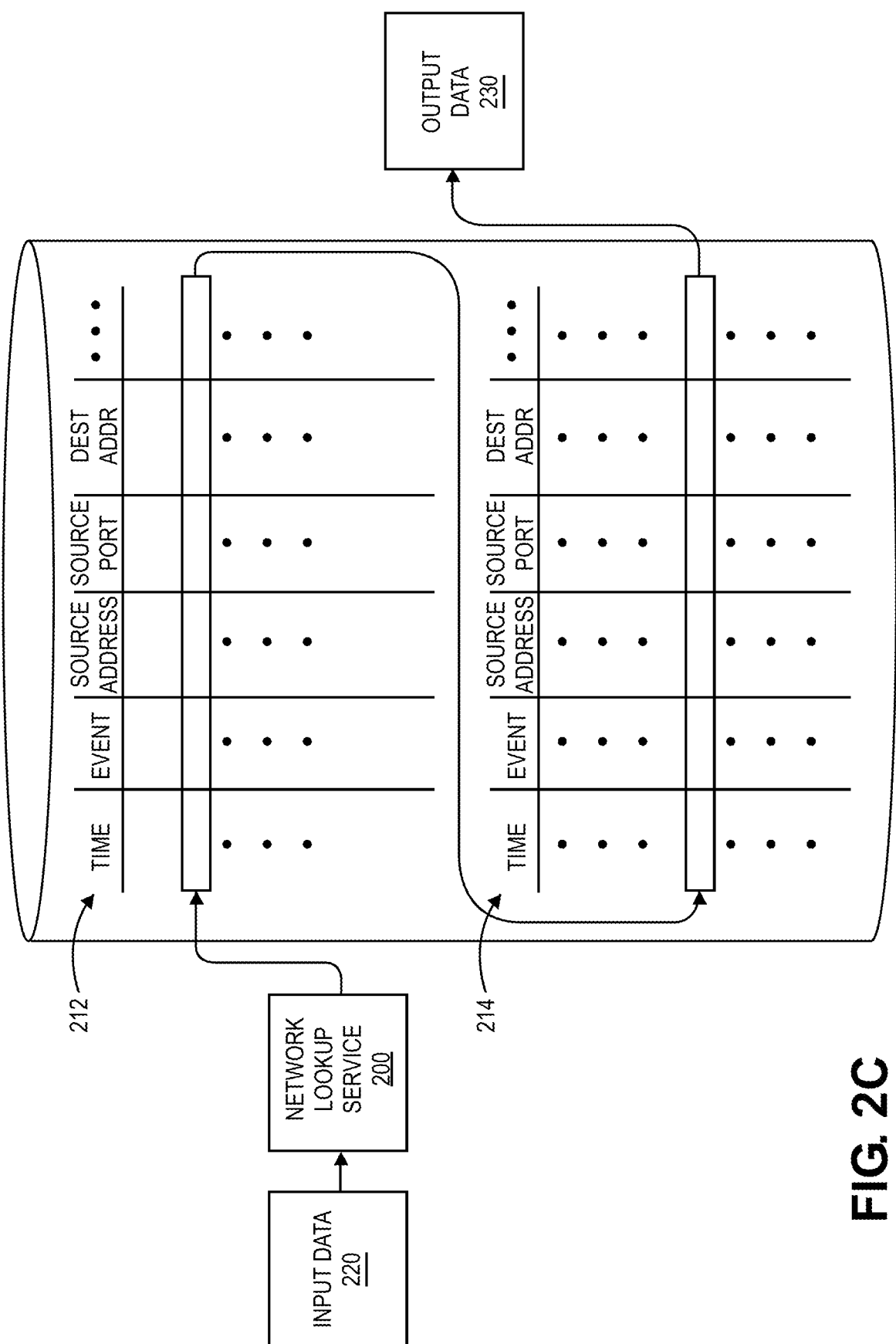

FIGS. 2A-2C are block diagrams illustrating an exemplary network lookup service 200, according to exemplary embodiments of the present disclosure.

FIG. 2A is a block diagram functionally illustrating exemplary network lookup service 200 that may be configured to determine native network information for virtually logged network information associated with certain network traffic. According to exemplary embodiments of the present disclosure, network lookup service 200 may be implemented, for example, as network lookup service 140. As shown in FIGS. 2A and 2B, network lookup service 200 may be configured to extract and compile network traffic information from network monitoring log 202 and network monitoring log 204 in real-time into corresponding translation tables 212 and 214, which may be stored and maintained in network log datastore 210. In exemplary implementations of the present disclosure, network monitoring log 202 may include a NetFlow log and network monitoring log 204 may include a syslog server. Further, network log datastore 210 may include a high-speed datastore, such as an in-memory datastore, a virtual caching service, and the like. In exemplary implementations, the translation tables may employ an in-memory key-value database, such as a Redis (e.g., Remote Dictionary Server) key-value database, or other data structure to facilitate timely and efficient querying of the translation tables.

As illustrated in FIGS. 2A and 2B, network traffic information may be extracted and compiled from network monitoring log 202 to generate and/or populate first translation table 212 stored and maintained in network log datastore 210, and further network traffic information may be extracted and compiled from network monitoring log 204 to generate and/or populate second translation table 214 stored and maintained in network log datastore 210. Further, the translation tables 212 and 214 stored and maintained in network log datastore 210 may be continuously updated in real-time as new network traffic information is logged by network monitoring log 202 and network monitoring log 204. Conversely, data that is older than a predetermined threshold (e.g., 12 hours, 24 hours, 36 hours, 48 hours, 1 week, etc.) may be deleted from the translation tables.

In exemplary implementations, network information may be extracted from network monitoring log 202 in connection with various network events and/or traffic to generate and/or populate first translation table 212. For example, the network information may include timestamp information, translated (e.g., an address that has been subjected to a NAT, etc.) destination addresses, translated destination ports, translated source addresses, translated source ports, network event types (e.g., creation or closing of a session), untranslated destination addresses, untranslated destination ports, untranslated source addresses, untranslated source ports, and the like. Further, the network information extracted from network monitoring log 202 used to generate and/or populate first translation table 212 stored and maintained by network log datastore may be continuously updated as new network traffic events are logged by network monitoring log 202.

Similarly, network information may also be extracted from network monitoring log 204 in connection with various network events and/or traffic to generate and/or populate second translation table 214. For example, the network information may include timestamp information, translated (e.g., an address that has been subjected to a NAT, etc.) destination addresses, translated destination ports, translated source addresses, translated source ports, network event types (e.g., creation or closing of a session), untranslated destination addresses, untranslated destination ports, untranslated source addresses, untranslated source ports, and the like. Further, the network information extracted from network monitoring log 204 used to generate and/or populate second translation table 214 stored and maintained by network log datastore may be continuously updated as new network traffic events are logged by network monitoring log 204.

According to exemplary embodiments, translation tables 212 and 214 may employ a Redis key-value database. For example, keys may first be defined for each particular translated source address, translated source port, translated destination address, translated destination port, and protocol extracted from network monitoring log 202 or network monitoring log 204. Further, when a network event with a particular translated source address, translated source port, translated destination address, translated destination port, and protocol is extracted from network monitoring log 202 or network monitoring log 204, the untranslated source address, untranslated source port, the network event type, and the timestamp associated with the network event may be written as a value of the key to the Redis database. Accordingly, for each network event logged in network monitoring log 202 and network monitoring log 204, the associated untranslated source address, untranslated source port, the network event type, and the timestamp may be written as key values to the corresponding key in real-time, so as to continuously update the translation tables. Further, key values that have exceeded a predetermined threshold time period (e.g., 1 hour, 12 hours, 24 hours, 36 hours, 1 week, etc.) may be periodically deleted.

In addition to generating and populating translation tables 212 and 214, network lookup service 200 may be configured to query first and second translation tables 212 and 214 to determine the native format (e.g., original state) of the network traffic information associated with a virtually logged network event, such as input data 220, where the original state (e.g., native format) of the network information is hidden by one or more translations and/or proxying layers. In exemplary implementations, the network traffic information associated with virtually logged network events may be obtained, for example, from various network interfaces via traffic/port mirroring, port monitoring, switched port analyzers, and the like. According to exemplary embodiments of the present disclosure, the native format may be determined for input data 220 in connection with a security incident, in connection with a network outage, and the like.

In exemplary implementations of the present disclosure, network information for input data 220 may be received by network lookup service 200. According to certain aspects of the present disclosure, the network information for input data 220 may be received and/or processed on a delay to ensure that the corresponding network information has been extracted from network monitoring log 202 and network monitoring log 204 and written to translation tables 212 and 214 stored and maintained by network log datastore 210. After receipt of the network information associated input data 220, certain network information, such as the source address, source port, destination address, destination port, protocol, and/or timestamp may be used to sequentially query translation tables 212 and 214 to determine the native format of the network information associated with input data 220. Accordingly, the native format of the network information may be associated with the input network event and/or the network information associated with the input network event and provided to downstream services and/or processes. For example, the native format of the network information may be provided to security tools, data log management tools, data analytics tools, and the like.

As shown in FIG. 2C, network lookup service 200 may sequentially query translation tables 212 and 214 with network information associated with input data 220 to determine the native network information associated with input data 220. Accordingly, network lookup service 200 may utilize the network information associated with input data 220 to query first translation table 212. For example, one or more of the source address, source port, destination address, destination port and/or timestamp associated with input data 220 may be used to query translation table 212 to identify a matching key in translation table 212. Optionally, if a matching key is not identified in the first translation table, the source address and the destination address may be switched, and translation table 212 may again be queried to identify a matching key. After a matching key is identified, the timestamp associated with the input network event may be used to lookup values (e.g., the untranslated source address, the untranslated source port, etc.) corresponding to the timestamp associated with the identified key. According to certain aspects of the present disclosure, the key values may be organized in a reverse sort order based on timestamps. Further, the timestamp values may be adjusted to compensate for jitter and/or latency between the various network traffic logs and information. Further, it may be determined whether the network event type indicates that the input network event corresponds to the creation of a session. In the event that the network event type indicates the closing of a session, it may be determined that there is a timestamp jitter and/or latency issue, and the values may be discarded.

In the event that the network event type indicates the creation of a session, the values obtained from translation table 212 (e.g., the untranslated source address, the untranslated source port, etc.) corresponding to the identified key and timestamp may then be used to query translation table 214. Similar to querying of the first translation table, network lookup service 200 may utilize the values obtained from translation table 212 to query translation table 214 to identify a matching key in translation table 214. After a matching key is identified, the timestamp associated with the input network event may be used to lookup values (e.g., the untranslated source address, the untranslated source port, etc.) corresponding to the timestamp. According to certain aspects of the present disclosure, the key values may be organized in a reverse sort based on timestamps and/or the timestamp values may be adjusted to compensate for jitter and/or latency between the various network traffic logs and information. The key values corresponding to the timestamp may correspond to the native network information (e.g., source address, source port, etc.) for input data 220. Accordingly, network lookup service 200 may return the native network information as output data 230, which may be associated with input data 220 and/or the network information associated with the input network event and provided to downstream services and/or processes.

Figure 3:
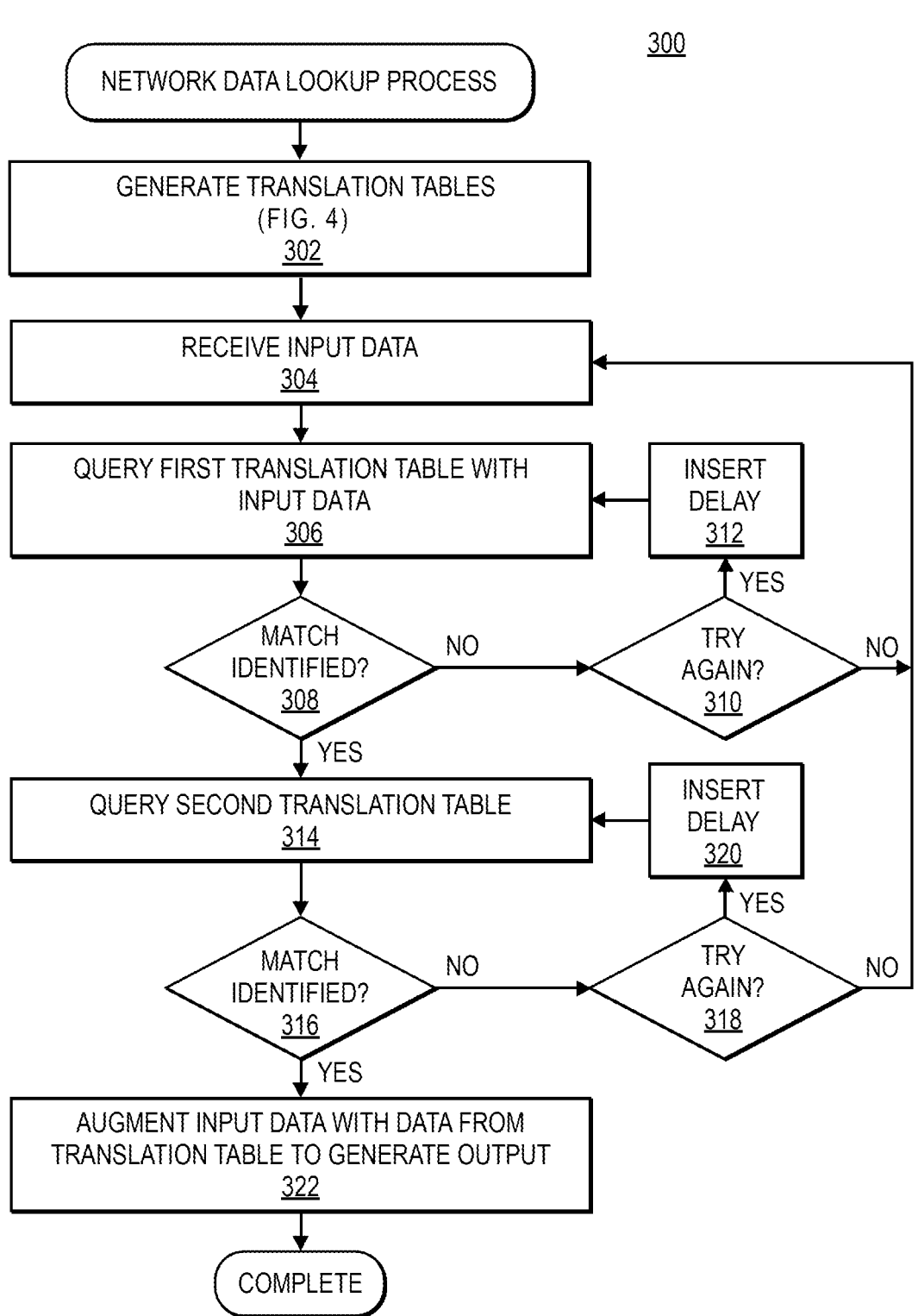
FIG. 3 is a flow diagram illustrating an exemplary network data lookup process, according to exemplary embodiments of the present disclosure.

FIG. 3 is a flow diagram illustrating an exemplary network data lookup process 300, according to exemplary embodiments of the present disclosure.

As shown in FIG. 3, process 300 may begin with step 302, where translation tables are generated. For example, multiple translation tables may be generated, continuously updated and/or populated, and the like based on network traffic information extracted and compiled from various network monitoring log sources. For example, such network information may be extracted and compiled from network traffic logs such as a NetFlow log, a syslog server, and the like. Generating and updating of translation tables are described in more detail herein in connection with at least FIGS. 1, 2A, 2B, and 4.

In step 304, input data may be received. According to exemplary embodiments of the present disclosure, the input data may include network information associated with a virtually logged network event where the original state (e.g., native format) of the network information is hidden by one or more translations and/or proxying layers and for which the native format (e.g., original state) is to be determined. In exemplary implementations, the network traffic information associated with virtually logged network events may be obtained, for example, from various network interfaces via traffic/port mirroring, port monitoring, switched port analyzers, and the like. According to exemplary embodiments of the present disclosure, the native format may be determined for the input data in connection with a security incident, in connection with a network outage, and the like.

In exemplary implementations of the present disclosure, the input data may be received and/or processed on a delay to ensure that the corresponding network information has been extracted from the various network traffic log sources and written to the corresponding translation tables. After receipt of the network information associated the input data, certain network information of the input data, such as the source address, source port, destination address, destination port, protocol, and/or timestamp may be used to query a first translation table, as in step 306. In exemplary implementations, the first translation table may be generated and/or populated with network traffic information extracted and compiled from a first network traffic data log source, such as a NetFlow log. Accordingly, one or more of the source address, source port, destination address, destination port and/or timestamp associated with the input data may be used to query the first translation table to identify a matching key in the first translation table, and the timestamp associated with the input data may be used to lookup values (e.g., the untranslated source address, the untranslated source port, etc.) corresponding to the timestamp associated with the identified key. In querying the first translation table, the values may be organized in a reverse sort order, such that the most recent timestamp may be identified. Further, the timestamps may be adjusted to account for latency and/or jitter. For example, timestamp windows may be applied in identifying matching timestamps (e.g., +/−5 ms, +/−10 ms, +/−20 ms, +/−50 ms, etc.), a timestamp offset may be applied, and the like. Further, as shown in FIG. 3, retry techniques may also be used. For example, in step 308, it may be determined if a matching key is identified in the first translation table. In the event that a match was not identified, it may be determined whether the query should be performed again, as in step 310. If another attempt is to be made, a delay may be added, as in step 312, and exemplary process 300 may return to step 306 to reattempt the query of the first translation table. Otherwise, exemplary process 300 may return to step 304. According to aspects of the present disclosure, whether the query is reattempted may be based on a number of query attempts, a duration since the timestamp associated with the input data, and the like. Optionally, it may also be determined whether the network event type indicates that the input data corresponds to the creation of a session. In the event that the network event type indicates the closing of a session, it may be determined that there is a timestamp jitter and/or latency issue, and the values may be discarded.

After identifying a match in the first translation table, the values obtained from the first translation table in step 306 (e.g., the untranslated source address, the untranslated source port, etc.) that correspond to the identified key and timestamp may then be used to query a second translation table, as in step 314. In exemplary implementations, the second translation table may be generated and/or populated with network traffic information extracted and compiled from a second network traffic data log source, such as a syslog server. Accordingly, the values (e.g., the untranslated source address, the untranslated source port, etc.) obtained from the first translation table may be used in a similar manner to query the second translation table to identify a matching key and the timestamp associated with the input data may be used to lookup values (e.g., the native source address, the native source port, etc.) corresponding to the timestamp associated with the identified key. In querying the second translation table, the values may be organized in a reverse sort order, such that the most recent timestamp may be identified. Further, the timestamps may be adjusted to account for latency and/or jitter. For example, timestamp windows may be applied in identifying matching timestamps (e.g., +/−5 ms, +/−10 ms, +/−20 ms, +/−50 ms, etc.), a timestamp offset may be applied, and the like. Further, as shown in FIG. 3, retry techniques may also be used. For example, in step 316, it may be determined if a matching key is identified in the second translation table. In the event that a match was not identified, it may be determined whether the query should be performed again, as in step 318. If another attempt is to be made, a delay may be added, as in step 320, and exemplary process 300 may return to step 314 to reattempt the query of the second translation table. Otherwise, exemplary process 300 may return to step 304. According to aspects of the present disclosure, whether the query is reattempted may be based on a number of query attempts, a duration since the timestamp associated with the input data, and the like.

Figure 4:
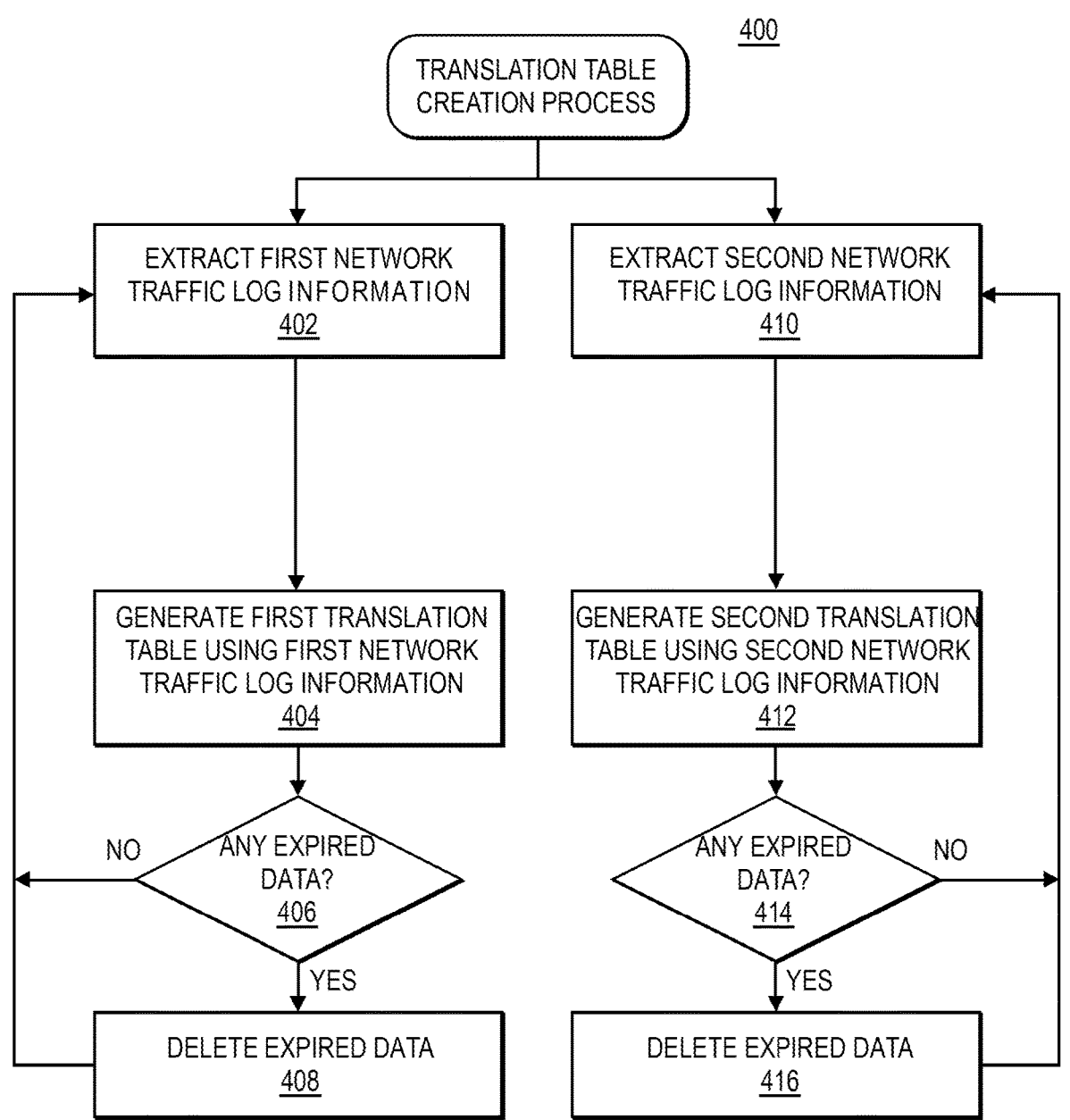
FIG. 4 is a flow diagram illustrating an exemplary translation table creation process, according to exemplary embodiments of the present disclosure.

FIG. 4 is a flow diagram illustrating an exemplary translation table creation process 400, according to exemplary embodiments of the present disclosure.

As shown in FIG. 4, exemplary method 400 may extract network traffic log information from more than one network traffic log source in parallel. For example, in step 402, network traffic log information may be extracted and compiled from a first source. In parallel, network traffic log information may be extracted and compiled from a second source, as in step 410. In exemplary implementations, the first source may include a NetFlow log, and the second source may include a syslog server.

In steps 404 and 412, the network traffic log information extracted from the first source and the second source may be used to generate a first translation table and a second translation table, respectively. According to exemplary embodiments of the present disclosure, the translation tables may be stored in a high-speed datastore, such as an in-memory datastore, a virtual caching service, and the like. In exemplary implementations, the translation tables may employ an in-memory key-value database, such as a Redis (e.g., Remote Dictionary Server) key-value database, or other data structure to facilitate timely and efficient querying of the translation tables.

In exemplary implementations, the first source from which network traffic information is extracted and compiled may include a NetFlow log. Accordingly, the extracted network traffic information may be used to generate and populate a first translation table based on the network traffic information for each network event logged by the NetFlow log. For example, the network traffic information extracted from the NetFlow log for each network event may include a timestamp, a translated (e.g., an address that has been subjected to a NAT, etc.) destination address, a translated destination port, a translated source address, a translated source port, a network event type (e.g., creation or closing of a session), an untranslated destination address, an untranslated destination port, an untranslated source address, an untranslated source port, and the like. Accordingly, the first translation table may include an entry for each logged network event that includes the extracted network traffic information associated with each logged network event and may be continuously updated as new network traffic events are logged in the NetFlow log.

Further, the first translation table may employ a Redis key-value database. In exemplary embodiments, the first translation table generated from the NetFlow log may include keys defined for each particular translated source address, translated source port, translated destination address, translated destination port, and protocol extracted from the NetFlow log. Accordingly, when a network event with a particular translated source address, translated source port, translated destination address, translated destination port, and protocol is extracted from the NetFlow log, the untranslated source address, untranslated source port, the network event type, and the timestamp associated with the network event may be written as the value of the key to the Redis database. Accordingly, for each network event logged in the NetFlow log, the associated untranslated source address, untranslated source port, the network event type, and the timestamp may be written as key values to the corresponding key in real-time, so as to continuously update the first translation table.

Additionally, the second source from which network traffic information associated with network events may also be extracted and compiled may include a syslog server. In exemplary implementations, the network traffic information extracted from the syslog server log for each network event may also include a timestamp, a translated (e.g., an address that has been subjected to a NAT, etc.) destination address, a translated destination port, a translated source address, a translated source port, a network event type (e.g., creation or closing of a session), an untranslated destination address, an untranslated destination port, an untranslated source address, an untranslated source port, and the like, which may be used to generate and/or populate the second translation table. Accordingly, the second translation table may include an entry for each logged network event that includes the extracted network traffic information associated with each logged network event and may be continuously updated as new network traffic events are logged in the syslog server. Further, according to exemplary embodiments of the present disclosure, the translated source addresses and the translated source ports of the second translation table (e.g., extracted from the syslog server) may correspond to the untranslated source addresses and the untranslated source ports that were written to the first translation table (e.g., and extracted from the NetFlow log). Further, the untranslated destination address, untranslated destination port, untranslated source address, and untranslated source port may correspond to the native format (e.g., original state) of the network information associated with the logged network events.

Continuing the exemplary implementation where the translation tables employ a Redis key-value database, in connection with the second translation table generated from the syslog server, keys may first be defined for each particular translated source address, translated source port, translated destination address, translated destination port, and protocol extracted from the syslog server. Accordingly, when a network event with a particular translated source address, translated source port, translated destination address, translated destination port, and protocol is extracted from the syslog server, the untranslated source address, untranslated source port, the network event type, and the timestamp associated with the network event may be written as the value of the key to the Redis database. Accordingly, for each network event logged in the syslog server, the associated untranslated source address, untranslated source port, the network event type, and the timestamp may be written as key values to the corresponding key in real-time, so as to continuously update the second translation table.

According to certain aspects of the present disclosure, exemplary method 400 may also purge expired network traffic information from the first and second translation tables. For example, an expiration threshold may be established (e.g., 1 hour, 12 hours, 24 hours, 36 hours, 1 week, etc.), and in steps 406 and 414, the timestamps of the network traffic information may be compared against the expiration to determine whether there is any expired network traffic information. If there is expired network traffic information, such expired network traffic information may be deleted from the first and second translation tables in steps 408 and 416, respectively, and method 400 may return to steps 402 and 410, where additional network traffic information may be extracted in connection with newly logged network traffic events, and process 400 may continue to use the additional network traffic information to continuously update and/or populate the first and second translation tables. If there is no expired network traffic information, method 400 may return to steps 402 and 410, to extract new network traffic information associated with newly logged network traffic events to continuously update and/or populate the first and second translation tables.

Figure 5:
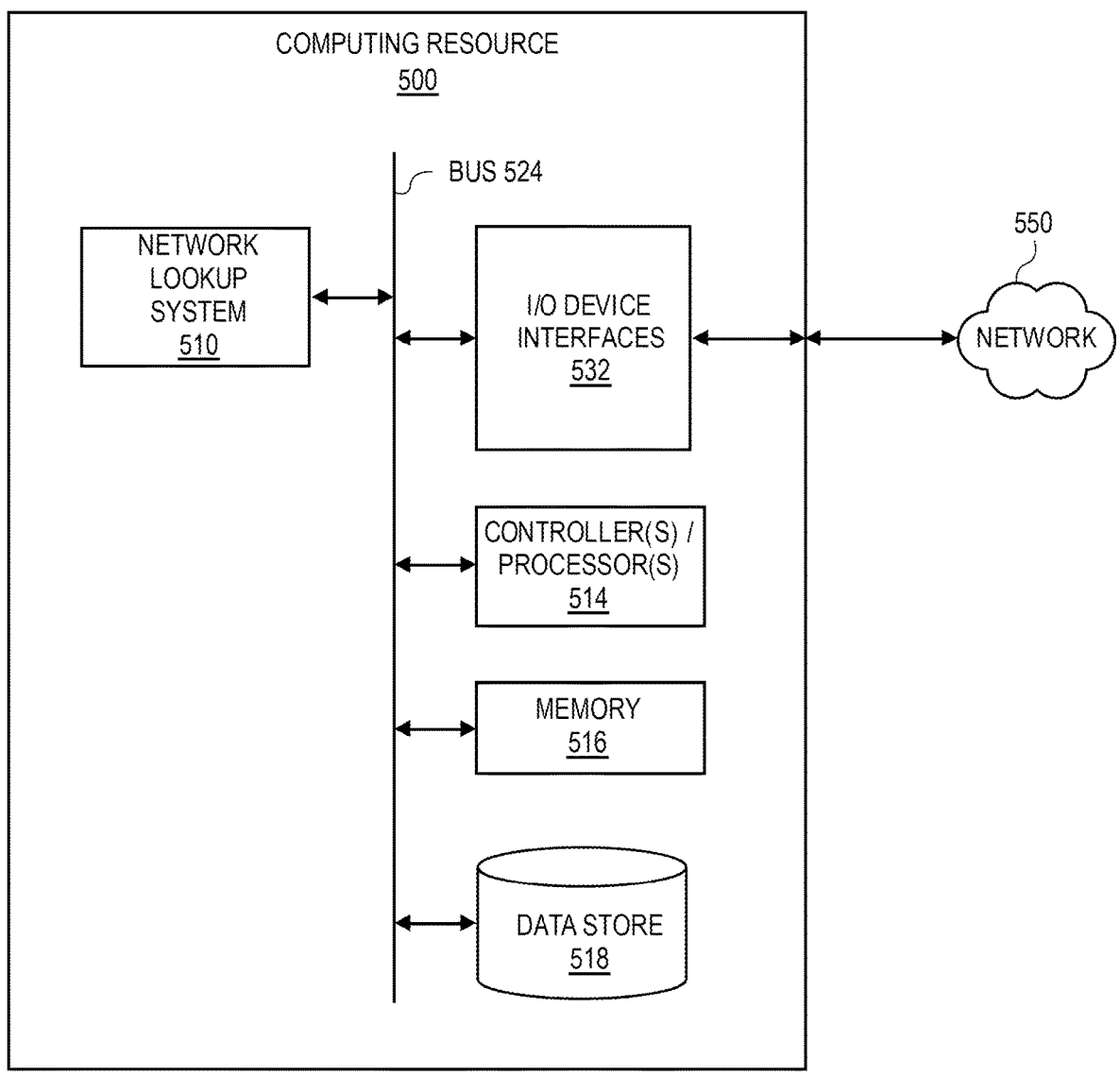
FIG. 5 is a block diagram of an exemplary computing resource, according to exemplary embodiments of the present disclosure.

FIG. 5 is a block diagram of an exemplary computing resource 500, according to exemplary embodiments of the present disclosure. According to certain implementations, computing resource 500 may form, for example, at least a portion of virtual network 130, and may include and/or execute network lookup system 510. In exemplary implementations, multiple computing resources 500 may be included in the system.

As shown in FIG. 5, computing resource 500 may include one or more controllers and/or processors 514, that may each include a central processing unit (CPU) for processing data and computer-readable instructions, and memory 516 for storing data and instructions. Memory 516 may individually include volatile random-access memory (RAM), non-volatile read only memory (ROM), non-volatile magnetoresistive random-access memory (MRAM) and/or other types of memory. Each computing resource 500 may also include a data storage component 518, for storing data, such as the translation tables, controller/processor-executable instructions, machine learning models, data sets, reference data sets, test data sets, program information, call graphs, source code, compiled code, run-time and/or dynamic information, and the like. Each data storage component may individually include one or more non-volatile storage types, such as magnetic storage, optical storage, solid-state storage, etc. Each computing resource 500 may also be connected to removable or external non-volatile memory and/or storage (such as a removable memory card, memory key drive, networked storage, etc.), internal, and/or external networks 550 (e.g., the Internet, cellular networks, satellite networks) through respective input/output device interfaces 532.

Computer instructions for operating computing resource 500 and its various components may be executed by the respective server's controller(s)/processor(s) 514, using the memory 516 as temporary "working" storage at runtime. The computer instructions may be stored in a non-transitory manner in non-volatile memory 516, data storage 518, and/or an external device(s). Alternatively, some or all of the executable instructions may be embedded in hardware or firmware on the respective device in addition to or instead of software.

For example, memory 516 may store program instructions that, when executed by the controller(s)/processor(s) 514, cause the controller(s)/processors 514 to determine network information in a native format in connection with virtually monitored and logged network traffic information, as discussed herein.

Computing resource 500 may also include input/output device interfaces 532. A variety of components may be connected through the input/output device interfaces. In exemplary implementations, the network traffic information associated with virtually logged network events may be obtained, for example, directly from other various network interfaces via traffic/port mirroring, port monitoring, switched port analyzers, and the like. Additionally, computing resource 500 may also include an address/data bus 524 for conveying data among components of the respective server. Each component within computing resource 500 may also be directly connected to other components in addition to (or instead of) being connected to other components across the bus 524.

The components of data bus 524, as illustrated in FIG. 5, are exemplary, and may be located as a stand-alone device or may be included, in whole or in part, as a component of a larger device or system.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 3 and 4, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Moreover, the systems and methods described herein may be implemented in electronic hardware, computer software, firmware, or any combination thereof. For example, in some implementations, processes or methods described herein may be operated, performed or executed using computer-readable media having sets of code or instructions stored thereon. Such media may include, but need not be limited to, random-access memory ("RAM") such as synchronous dynamic random-access memory ("SDRAM"), read-only memory ("ROM"), non-volatile random-access memory ("NVRAM"), electrically erasable programmable read-only memory ("EEPROM"), FLASH memory, magnetic or optical data storage media, or others. Alternatively, or additionally, the disclosed implementations may be realized at least in part by a computer-readable communication medium that carries or communicates program code in the form of instructions or data structures and that may be accessed, read, and/or executed by a computer. Additionally, code or instructions may be executed by one or more processors or other circuitry. For example, in some implementations, such components may include electronic circuits or hardware, programmable electronic circuits such as microprocessors, graphics processing units ("GPU"), digital signal processors ("DSP"), central processing units ("CPU") or other suitable electronic circuits, which may be executed or implemented using computer software, firmware, or any combination thereof, to perform the various operations described herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

Disjunctive language such as the phrase "at least one of X, Y, or Z," or "at least one of X, Y and Z," unless specifically stated otherwise, is otherwise understood with the context as used in general to present that an item, term, etc., may be any of X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" or "a device operable to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
extracting a first plurality of network log data from a first network traffic log source;
populating a first translation table stored in a high-speed database with the first plurality of network log data, wherein:
the first plurality of network log data includes first translated data that causes at least a portion of a plurality of native network information associated with the first plurality of network log data to be hidden; and
the first translation table stores the first plurality of network log data in a first plurality of key-value pairs;
extracting a second plurality of network log data from a second network traffic log source;
populating a second translation table stored in the high-speed database with the second plurality of network log data, wherein the second translation table stores the second plurality of network log data in a second plurality of key-value pairs;
receiving an input data element associated with a logged network event, wherein:
the logged network event corresponds to at least one of a security incident or a network outage; and
the input data element includes at least a source address, a source port, and a timestamp associated with the logged network event;
querying, using the input data element, the first translation table to determine a first key-value pair from the first plurality of key-value pairs;
querying, using the input data element and the first value of the first key-value pair, the second translation table to identify a second key-value pair from the second plurality of key-value pairs, wherein the second key-value pair corresponds to native network information for the logged network event;
associating at least a portion of a second value of the second key-value pair with the input data element; and
providing the second value to at least one of a plurality of tools to resolve the logged network event.

2. The computer-implemented method of claim 1, wherein querying the first translation table further includes identifying the first key-value pair based at least in part on the source address, the source port, and the timestamp of the input data element and a key source address, a key source port, and a key timestamp associated with the first key-value pair.

3. The computer-implemented method of claim 1, wherein:
the first network traffic log source includes a NetFlow log; and the second network traffic log source includes a syslog server.

4. The computer-implemented method of claim 1, wherein the second value of the second key-value pair includes at least one of a native source address or a native source port.

5. A computer-implemented method, comprising:
populating a first translation table with a first plurality of network traffic information from a first network traffic log, wherein the first plurality of network traffic information includes first translated data that causes at least a portion of a plurality of native network information associated with the first plurality of network traffic information to be hidden;
populating a second translation table with a second plurality of network traffic information from a second network traffic log;
querying the first translation table using network traffic information associated with a logged network event to correlate the logged network event to a first entry in the first translation table to obtain first untranslated information associated with the first entry in the first translation table, wherein the logged network event corresponds to at least one of a security incident or a network outage;
querying the second translation table using the network traffic information associated with the logged network event and the first untranslated information to correlate the logged network event to a second entry in the second translation table to obtain second untranslated information associated with the second entry in the second translation table; and
returning the second untranslated information to at least one of a plurality of tools to resolve the logged network event, wherein the second untranslated information corresponds to native network information for the logged network event.

6. The computer-implemented method of claim 5, wherein the first plurality of network traffic information includes at least one of:
a first plurality of translated source addresses associated with a first plurality of network events;
a first plurality of untranslated source addresses associated with the first plurality of network events;
a first plurality of translated source ports associated with the first plurality of network events; a first plurality of untranslated source ports associated with the first plurality of network events; or
a first plurality of timestamps associated with the first plurality of network events.

7. The computer-implemented method of claim 6, wherein:
the first translation table includes a first plurality of key-value pairs that include a first plurality of keys and a first plurality of corresponding values;
the first plurality of keys are defined by at least one of the first plurality of translated source addresses or the first plurality of translated source ports; and
the first plurality of corresponding values includes at least one of the first plurality of untranslated source addresses or the first plurality of untranslated source ports.

8. The computer-implemented method of claim 7, wherein:
the network traffic information associated with the logged network event includes a source address, a source port, and a timestamp; and querying the first translation table includes:

determining a first key from the first plurality of keys based at least in part on the source address, the source port, the first plurality of translated source addresses, and the first plurality of translated source ports; and determining, based at least on the timestamp and the first plurality of timestamps, a first corresponding value associated with the first key as the first untranslated information.

9. The computer-implemented method of claim 8, wherein determining the first corresponding value includes adjusting at least one of the timestamp or at least one of the first plurality of timestamps to compensate for at least one of a jitter or a latency.

10. The computer-implemented method of claim 8, wherein:

the second plurality of network traffic information includes at least one of:

a second plurality of translated source addresses associated with a second plurality of network events;

a second plurality of untranslated source addresses associated with the second plurality of network events;

a second plurality of translated source ports associated with the second plurality of network events;

a second plurality of untranslated source ports associated with the second plurality of network events; or a second plurality of timestamps associated with the second plurality of network events;

the second plurality of translated source addresses corresponds to the first plurality of untranslated source addresses; and the second plurality of translated source ports corresponds to the first plurality of untranslated source ports.

11. The computer-implemented method of claim 10, wherein:

the second translation table includes a second plurality of key-value pairs that include a second plurality of keys and a second plurality of corresponding values;

the second plurality of keys are defined by at least one of the second plurality of translated source addresses or the second plurality of translated source ports; and the second plurality of corresponding values includes at least one of the second plurality of untranslated source addresses or the second plurality of untranslated source ports.

12. The computer-implemented method of claim 11, wherein querying the second translation table includes:

determining a second key from the second plurality of keys based at least in part on the source address, the source port, and the first untranslated information; and determining, based at least on the timestamp and the second plurality of timestamps, a second corresponding value associated with the second key as the second untranslated information.

13. The computer-implemented method of claim 5, wherein the network traffic information associated with the logged network event includes multiple manipulations.

14. A computing system, comprising:

one or more processors; and a memory storing program instructions that, when executed by the one or more processors, cause the one or more processors to at least:

extract first network traffic information associated with a first network event from a first network traffic log, wherein:

the first network traffic information includes a first translated source address, a first translated source port, a first untranslated source address, a first untranslated source port, and a first timestamp; and the first translated source address and the first translated source port cause native network information associated with the first network event to be hidden;

generate a first key for a first translation table based on the first network traffic information;

extract second network traffic information associated with the first network event from a second network traffic log, wherein the second network traffic information includes a second translated source address, a second translated source port, a second untranslated source address, a second untranslated source port, and a second timestamp;

generate a second key for a second translation table based on the second network traffic information;

query, using input traffic information associated with a logged network event, the first translation table to correlate the logged network event with the first key, wherein the logged network event includes at least one of a security incident or a network outage;

query, using the input traffic information and a first value associated with the first key, the second translation table to correlate the logged network event with the second key;

associate a second value associated with the second key with the logged network event, wherein the second value associated with the second key corresponds to native network information for the logged network event; and provide the second value to at least one of a plurality of tools to resolve the logged network event.

15. The computing system of claim 14, wherein:

querying the first translation table includes determining the first key from a first plurality of keys based at least in part on the first translated source address, the first translated source port, and the first timestamp; and the first value includes the first untranslated source address and the first untranslated source port.

16. The computing system of claim 15, wherein querying the second translation table includes determining the second key from a second plurality of keys based at least in part on the first untranslated source address, the first untranslated source port, and the second timestamp.

17. The computing system of claim 15, wherein determining the first key includes adjusting at least one of the first timestamp or a timestamp associated with the input traffic information to compensate for at least one of a jitter or a latency.

18. The computing system of claim 14, wherein the second value of the second key is a native format of the input traffic information.

* * * * *